(12) United States Patent
Balogh et al.

(10) Patent No.: US 12,104,258 B2
(45) Date of Patent: Oct. 1, 2024

(54) MELT SPINNING METHODS FOR FORMING LITHIUM-METAL FOILS AND ELECTRODES OF ELECTROCHEMICAL DEVICES

(71) Applicant: GM GLOBAL TECHNOLOGY OPERATIONS LLC, Detroit, MI (US)

(72) Inventors: Michael P. Balogh, Novi, MI (US); Jin Liu, Novi, MI (US); Ryan C. Sekol, Grosse Pointe Woods, MI (US); Shaomao Xu, Sterling Heights, MI (US); Erik D. Huemiller, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 837 days.

(21) Appl. No.: 17/179,547

(22) Filed: Feb. 19, 2021

(65) Prior Publication Data

US 2022/0267886 A1 Aug. 25, 2022

(51) Int. Cl.
*B22D 11/06* (2006.01)
*C23C 6/00* (2006.01)
(Continued)

(52) U.S. Cl.
CPC ............ *C23C 6/00* (2013.01); *H01M 4/0404* (2013.01); *H01M 4/0435* (2013.01);
(Continued)

(58) Field of Classification Search
CPC . B22D 11/06; B22D 11/0602; B22D 11/0608; B22D 11/0611; B22D 11/0622;
(Continued)

(56) References Cited

U.S. PATENT DOCUMENTS

| | | | |
|---|---|---|---|
| 4,982,780 A | * | 1/1991 | Stepanenko ........... B22D 11/06 |
| | | | 164/463 |
| 6,275,004 B1 | | 8/2001 | Tamai et al. |
| | | | (Continued) |

FOREIGN PATENT DOCUMENTS

| | | |
|---|---|---|
| CN | 1868011 A | 11/2006 |
| CN | 107210412 A | 9/2017 |
| | (Continued) | |

OTHER PUBLICATIONS

Haz-Map, "Lithium", https://haz-map.com/Agents/1548 (Year: 2023).*
(Continued)

*Primary Examiner* — Kevin P Kerns
*Assistant Examiner* — Steven S Ha
(74) *Attorney, Agent, or Firm* — Quinn IP Law (57) ABSTRACT

Presented are lithium-metal electrodes for electrochemical devices, systems and methods for manufacturing lithium-metal foils, and vehicle battery packs containing battery cells with lithium-metal anodes. A method of melt spinning lithium-metal foils includes melting lithium (Li) metal stock in an actively heated vessel to form molten Li metal. Using pressurized gas, the molten Li metal is ejected through a slotted nozzle at the base of the vessel. The ejected molten Li metal is directly impinged onto an actively cooled and spinning quench wheel or a carrier sheet that is fed across a support roller underneath the vessel. The molten Li metal is cooled and solidified on the spinning wheel/carrier sheet to form a Li-metal foil. The carrier sheet may be a polymeric carrier film or a copper current collector foil. An optional protective film may be applied onto an exposed surface of the Li-metal foil opposite the carrier sheet.

20 Claims, 5 Drawing Sheets

(51) Int. Cl.
  *H01M 4/04*    (2006.01)
  *H01M 4/38*    (2006.01)
  *H01M 4/66*    (2006.01)
  *H01M 10/0525* (2010.01)
  *H01M 10/44*   (2006.01)
  *H01M 4/1395*  (2010.01)

(52) U.S. Cl.
  CPC ......... *H01M 4/0485* (2013.01); *H01M 4/382* (2013.01); *H01M 4/667* (2013.01); *H01M 10/0525* (2013.01); *H01M 10/44* (2013.01); *H01M 4/1395* (2013.01); *H01M 2220/20* (2013.01)

(58) Field of Classification Search
  CPC ............ B22D 11/0628; B22D 11/0648; B22D 11/0651; B22D 11/0654; B22D 11/0657; B22D 11/0665; B22D 11/0682; B22D 11/0685; B22D 11/0688
  See application file for complete search history.

(56) References Cited

U.S. PATENT DOCUMENTS

| | | |
|---|---|---|
| 7,851,085 B2 | 12/2010 | Obrovac et al. |
| 8,565,949 B2 | 10/2013 | Christman et al. |
| 9,028,565 B2 | 5/2015 | Huang |
| 9,142,830 B2 | 9/2015 | Xiao et al. |
| 9,142,980 B2 | 9/2015 | Lee |
| 9,281,514 B2 | 3/2016 | Rhodes et al. |
| 9,660,462 B2 | 5/2017 | Jeon |
| 9,923,189 B2 | 3/2018 | Xiao |
| 10,062,898 B2 | 8/2018 | Xiao |
| 10,199,643 B2 | 2/2019 | Zhou et al. |
| 10,367,201 B2 | 7/2019 | Yang et al. |
| 10,388,959 B2 | 8/2019 | Dong et al. |
| 10,424,784 B2 | 9/2019 | Yang et al. |
| 10,435,773 B2 | 10/2019 | Liu et al. |
| 10,446,884 B2 | 10/2019 | Yang et al. |
| 10,511,049 B2 | 12/2019 | Yang et al. |
| 10,566,652 B2 | 2/2020 | Dai et al. |
| 10,573,879 B2 | 2/2020 | Yang et al. |
| 10,629,941 B2 | 4/2020 | Dai et al. |
| 10,637,048 B2 | 4/2020 | Qi et al. |
| 10,673,046 B2 | 6/2020 | Dadheech et al. |
| 2006/0046149 A1 | 3/2006 | Yong |
| 2007/0251665 A1* | 11/2007 | Byrne ................ B22D 11/0611 164/463 |
| 2011/0215767 A1 | 9/2011 | Johnson et al. |
| 2011/0248675 A1 | 10/2011 | Shiu et al. |
| 2012/0206296 A1 | 8/2012 | Wan |
| 2013/0119935 A1 | 5/2013 | Sufrin-Disler et al. |
| 2014/0152232 A1 | 6/2014 | Johnson et al. |
| 2016/0181594 A1 | 6/2016 | Balogh et al. |
| 2017/0324073 A1* | 11/2017 | Herle ................ H01M 50/431 |
| 2019/0280333 A1 | 9/2019 | Raymond et al. |
| 2019/0280334 A1 | 9/2019 | Raymond et al. |
| 2019/0319259 A1 | 10/2019 | Balogh et al. |
| 2019/0393546 A1 | 12/2019 | Raymond et al. |
| 2021/0060638 A1* | 3/2021 | Herle ................ H01M 4/0409 |

FOREIGN PATENT DOCUMENTS

| | | |
|---|---|---|
| CN | 108604668 A | 9/2018 |
| CN | 108655352 A | 10/2018 |
| CN | 109417164 A | 3/2019 |
| EP | 0411949 A1 * | 2/1991 |
| WO | WO-2017190642 A1 * | 11/2017 |
| WO | WO-2020031697 A1 * | 2/2020 |

OTHER PUBLICATIONS

English Machine Translation of WO2020031697A1 (Year: 2020).*
English Machine Translation of Wang WO2017190642A1 (Year: 2017).*

* cited by examiner

MELT SPINNING METHODS FOR FORMING LITHIUM-METAL FOILS AND ELECTRODES OF ELECTROCHEMICAL DEVICES

INTRODUCTION

The present disclosure relates generally to electrochemical devices. More specifically, aspects of this disclosure relate to lithium-metal electrodes for rechargeable lithium-class battery cells of electric-drive vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric (collectively "electric-drive") vehicles, on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits the internal combustion engine and attendant peripheral components from the powertrain system, relying on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Many commercially available hybrid electric and full electric vehicles employ a rechargeable traction battery pack to store and supply the requisite power for operating the powertrain's traction motor unit(s). In order to generate tractive power with sufficient vehicle range and speed, a traction battery pack is significantly larger, more powerful, and higher in capacity (Amp-hr) than a standard 12-volt starting, lighting, and ignition (SLI) battery. Compared to the single cell of an SLI battery, contemporary traction battery packs group stacks of battery cells into individual battery modules that are mounted onto the vehicle chassis, e.g., by a battery pack housing or support tray. Stacked electrochemical battery cells may be connected in series or parallel through use of an electrical interconnect board (ICB). The electrical tabs of the individual battery cells, which project out from the module housing, may be bent against and welded to shared busbar plates. A dedicated Electronic Battery Control Module (EBCM), through collaborative operation with a Powertrain Control Module (PCM) and Traction Power Inverter Module (TPIM), regulates the opening and closing of battery pack contactors to govern operation of the battery pack.

There are four primary types of batteries that are used in electric-drive vehicles: lithium-class batteries, nickel-metal hydride batteries, ultracapacitor batteries, and lead-acid batteries. As per lithium-class designs, lithium-metal (primary) batteries and lithium-ion (secondary) batteries make up the bulk of commercial lithium battery (LiB) configurations with Li-ion batteries being employed in automotive applications due to their enhanced stability, energy density, and rechargeable capabilities. A standard lithium-ion cell is composed to two conductive electrodes, an electrolyte material, and a permeable separator, all of which are enclosed inside an electrically insulated packaging. One electrode serves as a positive electrode ("cathode") and the other electrode serves as a negative electrode ("anode"). Rechargeable Li-ion batteries operate by reversibly passing lithium ions back and forth between these negative and positive electrodes. The separator, which generally consists of a microporous polymeric membrane, is disposed between the two electrodes to prevent electrical short circuits while also allowing the transport of ionic charge carriers. The electrolyte is suitable for conducting lithium (Li) ions and may be in solid form (e.g., solid state diffusion) or liquid form (e.g., liquid phase diffusion). Lithium-ions move from the negative electrode to the positive electrode during discharge of the battery while under load, and in the opposite direction when charging the battery.

SUMMARY

Presented herein are lithium-metal electrodes for electrochemical devices, methods for manufacturing and methods for employing lithium-metal foils, and motor vehicles equipped with rechargeable traction battery packs containing stacked battery cells fabricated with lithium-metal anodes. By way of example, metal casting processes and melt spinning methods are presented for forming lithium-metal foils, such as those used to manufacture the electrodes of lithium-class batteries. A planar-flow melt spinning process used to form thin Li-metal foils includes melting lithium metal in an inert vessel containing, for example, pressurized argon gas. Once melted, the pressurized inert gas forces the molten metal through a narrow-slotted nozzle at the base of the vessel. The molten metal impinges upon a cooled spinning wheel or a carrier sheet, such as a copper current collector foil, where the metal solidifies to form a thin Li-metal foil. Prior to application and solidification, the carrier sheet may be pretreated with a surface coating, texturizing, or calendaring to facilitate bonding between the Li-metal foil and the carrier sheet. The foil-and-sheet subassembly may then be wound around a take-up roller, e.g., for subsequent processing or shipping. The thickness of the resultant foil may be controlled by adjusting the flow rate of the molten metal, the gap between the nozzle and the subjacent roller, the size of the slotted nozzle, and/or the rotational speed of the spinning rollers.

Attendant benefits for at least some of the disclosed concepts include manufacturing processes for forming lithium-metal foils through planar-flow melt spinning techniques that meet stringent production rate requirements at a reduced cost and with improved part-to-part quality. For battery electrode applications, the melt spinning process forms and bonds a Li-metal foil to a current collector in a single process, helping to further reduce manufacturing time, complexity, and costs with a concomitant increase in production throughput. Other attendant benefits may include the ability to easily scale-up Li-ion battery cell fabrication and lower individual piece cost and weight. In addition to improved production rates and mitigated manufacturing costs, disclosed concepts may help to increase driving range, fuel economy, and vehicle performance.

Aspects of this disclosure are directed to manufacturing processes, control logic, and computer-readable media (CRM) for making and/or using lithium-based electrode tabs for rechargeable lithium-class battery cells. In an example, a method is presented for melt spinning lithium-metal foils. This representative method includes, in any order and in any combination with any of the above and below disclosed options and features: melting a batch of lithium metal stock in a heated vessel (e.g., metal or ceramic crucible) to form molten Li metal; ejecting the molten Li metal through a slotted nozzle of the vessel, e.g., via pneumatic, hydraulic, and/or electro-mechanical processes; applying the ejected molten Li metal onto an actively cooled and spinning quench wheel or a carrier sheet that is fed across a spinning support roller underneath the vessel to form thereon a sheet of molten Li metal; and solidifying the sheet of molten Li metal on the cooled spinning wheel or carrier sheet to form a Li-metal foil.

Additional aspects of this disclosure are directed to lithium-class battery cells with lithium-metal electrodes, rechargeable battery packs employing such lithium-class battery cells, and motor vehicles equipped with such battery packs. As used herein, the terms "vehicle" and "motor vehicle" may be used interchangeably and synonymously to include any relevant vehicle platform, such as passenger vehicles (ICE, REV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, e-bikes, e-scooters, etc. For non-automotive applications, disclosed concepts may be implemented for any logically relevant use, including stand-alone power stations and portable power packs, photovoltaic systems, handheld electronic devices, pumping equipment, machine tools, appliances, etc.

Aspects of this disclosure are also directed to battery cell production facilities and assembly lines for fabricating lithium-metal foils and lithium-metal electrodes for electrochemical devices. For instance, a melt spinning system is presented for producing lithium-metal foils, which may be used for making battery electrodes or other constituent parts of an electrochemical device. The melt spinning system includes a vessel that stows therein lithium (Li) metal stock, such as lithium and Li-alloy ingots, pellets, discs, granules, etc. An active heating element, which is in thermal communication with the vessel, selectively melts the Li metal stock into molten Li metal. A slotted nozzle is attached to the vessel and ejects the molten Li metal from the vessel. Adjacent the slotted nozzle is an actively cooled and spinning quench wheel or a roller-borne carrier sheet that receives thereon and solidifies a sheet of the ejected molten Li metal to form a Li-metal foil.

For any of the disclosed systems, methods, and applications, the carrier sheet may be a current collector foil (e.g., copper, titanium, steel, etc.) that is fed from a feed roller across the support roller to traverse underneath the heated vessel. In this instance, the molten Li metal is directly impinged onto the current collector foil. Alternatively, the carrier sheet may be a polymeric carrier film (e.g., polyethylene terephthalate (PET)) that is fed from a feed roller across the support roller to traverse underneath the heated vessel. In this instance, the molten Li metal is directly impinged onto the polymeric carrier film. As yet a further option, the ejected molten Li metal may be directly impinged onto a succession or sheet of solid-state cathode electrodes conveyed on the moving carrier sheet, e.g., to form a cathode/solid electrolyte/anode sandwich structure for a solid-state battery.

For any of the disclosed systems, methods, and applications, the spinning wheel may be a metallic or ceramic quench wheel that is actively cooled (e.g., air cooled or water cooled) to an operating temperature of about 45 degrees Celsius (° C.) or less. In this instance, the ejected molten Li metal is directly impinged onto the quench wheel. As yet another option, the molten Li metal may be ejected through the slotted nozzle of the vessel by injecting an inert gas into the vessel; the inert gas is then pressurized to at least a predetermined differential ejection pressure (e.g., 40 to 400 Pa) sufficient to eject the molten metal at a predefined rate. Alternatively, the molten Li metal may be ejected from the heated vessel via a pneumatic device, a hydraulic device, or an electromechanical device.

For any of the disclosed systems, methods, and applications, a contact surface of the carrier sheet may be pretreated with a bond-enhancing surface treatment prior to ejecting the molten Li metal onto the carrier sheet. The bond-enhancing surface treatment may include coating, texturizing, and/or calendaring the contact surface. The bond-enhancing surface treatment may be applied to the contact surface of the carrier sheet via electrolysis, plasma vapor deposition, atomic layer deposition, solution spray, and/or etching. For at least some embodiments, a thickness of the Li-metal foil may be modified by: adjusting a flowrate at which the molten Li metal is ejected through the slotted nozzle; adjusting a gap distance between the slotted nozzle and the cooled spinning wheel/carrier sheet; and/or adjusting a speed of the cooled spinning wheel/carrier sheet.

For any of the disclosed systems, methods, and applications, a protective film (e.g., PET sheet) may be applied onto an exposed surface of the Li-metal foil, opposite the carrier sheet, after solidifying the molten Li metal. A double-sided, planar-flow melt spinning option may include melting an additional lot of Li metal stock in a discrete vessel to form another batch of molten Li metal. This accompanying batch of molten Li metal may be ejected through a slotted nozzle of the second vessel and concomitantly applied onto a side of the carrier sheet that is opposite the Li-metal foil. The additional batch of molten Li metal is cooled and solidified on the carrier sheet to form another Li-metal foil.

For any of the disclosed systems, methods, and applications, the carrier sheet may be pulled from a feed (idler) roller and threaded between the support roller and the vessel's slotted nozzle such that the ejected molten Li metal is applied directly onto the carrier sheet. The carrier sheet may then be drawn from the feed roller onto a motor-driven take-up (drive) roller. As yet a further option, the Li metal stock may be melted using an induction heating element or resistance heating element that heats the vessel to at least about 180° C.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features described above and below.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
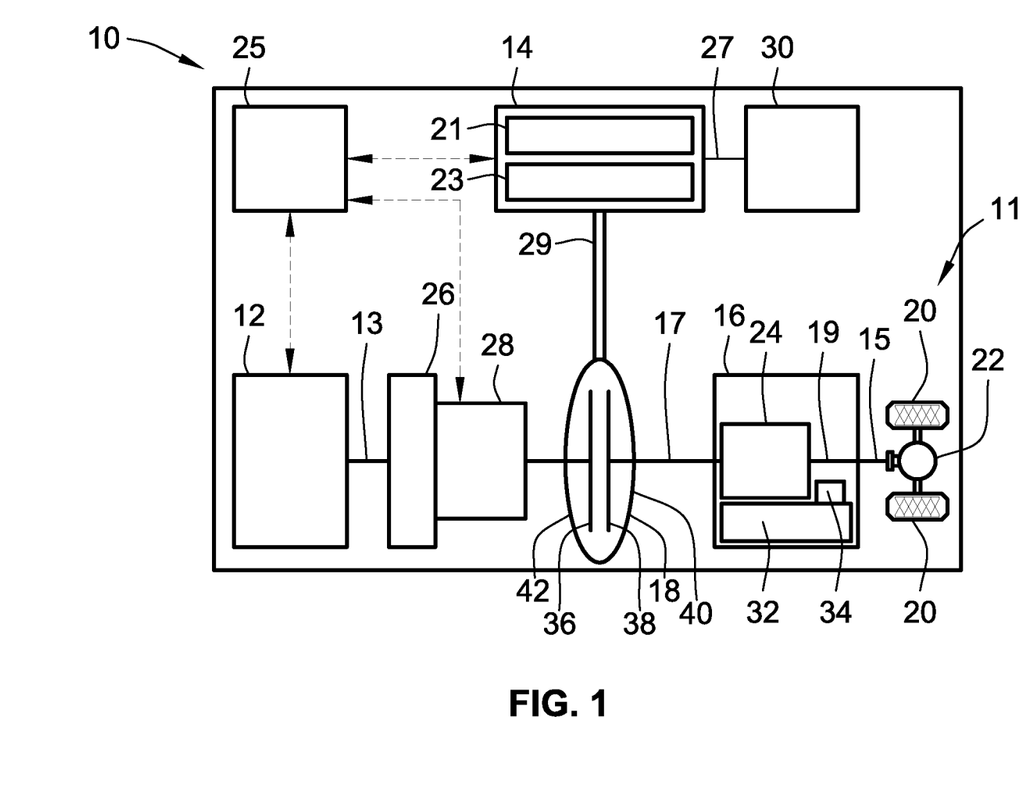
FIG. 1 is a schematic illustration of a representative electric-drive vehicle with a hybrid electric powertrain employing an electric motor/generator unit (MGU) powered by a rechargeable traction battery pack in accord with aspects of the present disclosure.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. The illustrated automobile 10—also referred to herein as "motor vehicle" or "vehicle" for short—is merely an exemplary application with which novel aspects of this disclosure may be practiced. In the same vein, implementation of the present concepts into a hybrid electric powertrain should also be appreciated as a representative implementation of the novel concepts disclosed herein. As such, it will be understood that facets of the present disclosure may be applied to other powertrain architectures, incorporated into any logically relevant type of motor vehicle, and utilized for both automotive and non-automotive applications alike. Lastly, only select components have been shown and will be described in additional detail herein. Nevertheless, the vehicles (FIG. 1), electrochemical devices (FIG. 2), and manufacturing systems (FIGS. 3-5) discussed below may include numerous additional and alternative features, and other available peripheral components and hardware, for carrying out the various methods and functions of this disclosure.

The representative vehicle powertrain system is shown in FIG. 1 with a prime mover—represented herein by a restartable internal combustion engine (ICE) assembly 12 and an electric motor/generator unit (MGU) 14—that drivingly connects to a driveshaft 15 of a final drive system 11 by a multi-speed automatic power transmission 16. The engine 12 transfers power, preferably by way of torque via an engine crankshaft 13 (also referred to herein as "engine output member"), to an input side of the transmission 16. Engine torque is first transmitted via the crankshaft 13 to rotate an engine-driven torsional damper assembly 26, and concomitantly transferred through the torsional damper assembly 26 to an engine disconnect device 28. This engine disconnect device 28, when operatively engaged, transmits torque received from the ICE assembly 12, by way of the damper 26, to input structure of the torque converter (TC) assembly 18. As the name implies, the engine disconnect device 28 may be selectively disengaged to drivingly disconnect the engine 12 from the motor 14, TC assembly 18, and transmission 16.

To propel the hybrid vehicle 10 of FIG. 1, the transmission 16 is adapted to receive, selectively manipulate, and distribute tractive power output from the engine 12 and motor 14 to the vehicle's final drive system 11. The final drive system 11 is represented herein by a driveshaft 15, rear differential 22, and a pair of rear road wheels 20. The power transmission 16 and torque converter 18 of FIG. 1 may share a common transmission oil pan or "sump" 32 for supply of hydraulic fluid. A shared transmission pump 34 provides sufficient hydraulic pressure for the fluid to selectively actuate hydraulically activated elements of the transmission 16, the TC assembly 18 and, for some implementations, the engine disconnect device 28.

The ICE assembly 12 operates to propel the vehicle 10 independently of the electric traction motor 14, e.g., in an "engine-only" operating mode, or in cooperation with the motor 14, e.g., in "vehicle-launch" or "motor-boost" operating modes. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit ("motor") 14 that operatively connects via a motor support hub, shaft, or belt 29 (also referred to herein as "motor output member") to the hydrodynamic torque converter 18. The torque converter 18, in turn, drivingly connects the motor 14 to an input shaft 17 ("transmission input member") of the transmission 16. The electric motor/generator unit 14 is composed of an annular stator assembly 21 circumscribing and concentric with a cylindrical rotor assembly 23. Electric power is provided to the stator 21 through a high-voltage electrical system, including electrical conductors/cables 27 that pass through the motor housing via suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25.

Power transmission 16 may use differential gearing 24 to achieve selectively variable torque and speed ratios between transmission input and output shafts 17 and 19, respectively. One form of differential gearing is the epicyclic planetary gear arrangement, which offers the advantage of compactness and different torque and speed ratios among members of the planetary gearing. Traditionally, hydraulically actuated torque establishing devices, such as clutches and brakes, are selectively engageable to activate the aforementioned gear elements for establishing desired forward and reverse speed ratios between the transmission's input and output shafts 17, 19. While envisioned as an 6 or 8-speed automatic transmission, the power transmission 16 may optionally take on other functionally appropriate configurations, including Continuously Variable Transmission (CVT) architectures, automated-manual transmissions, etc.

Hydrodynamic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is juxtaposed in serial power-flow fluid communication with the turbine 38, with a stator (not shown) interposed between the impeller 36 and turbine 38 to selectively alter fluid flow therebetween. The transfer of torque from the engine and motor output members 13, 29 to the transmission 16 via the TC assembly 18 is through stirring excitation of hydraulic fluid, such as transmission oil, inside the TC's internal fluid chamber caused by rotation of the impeller and turbine 36, 38 blades. To protect these components, the torque converter assembly 18 is constructed with a TC pump housing, defined principally by a transmission-side pump shell 40 fixedly attached to an engine-side pump cover 42 such that a working hydraulic fluid chamber is formed therebetween.

Figure 2:
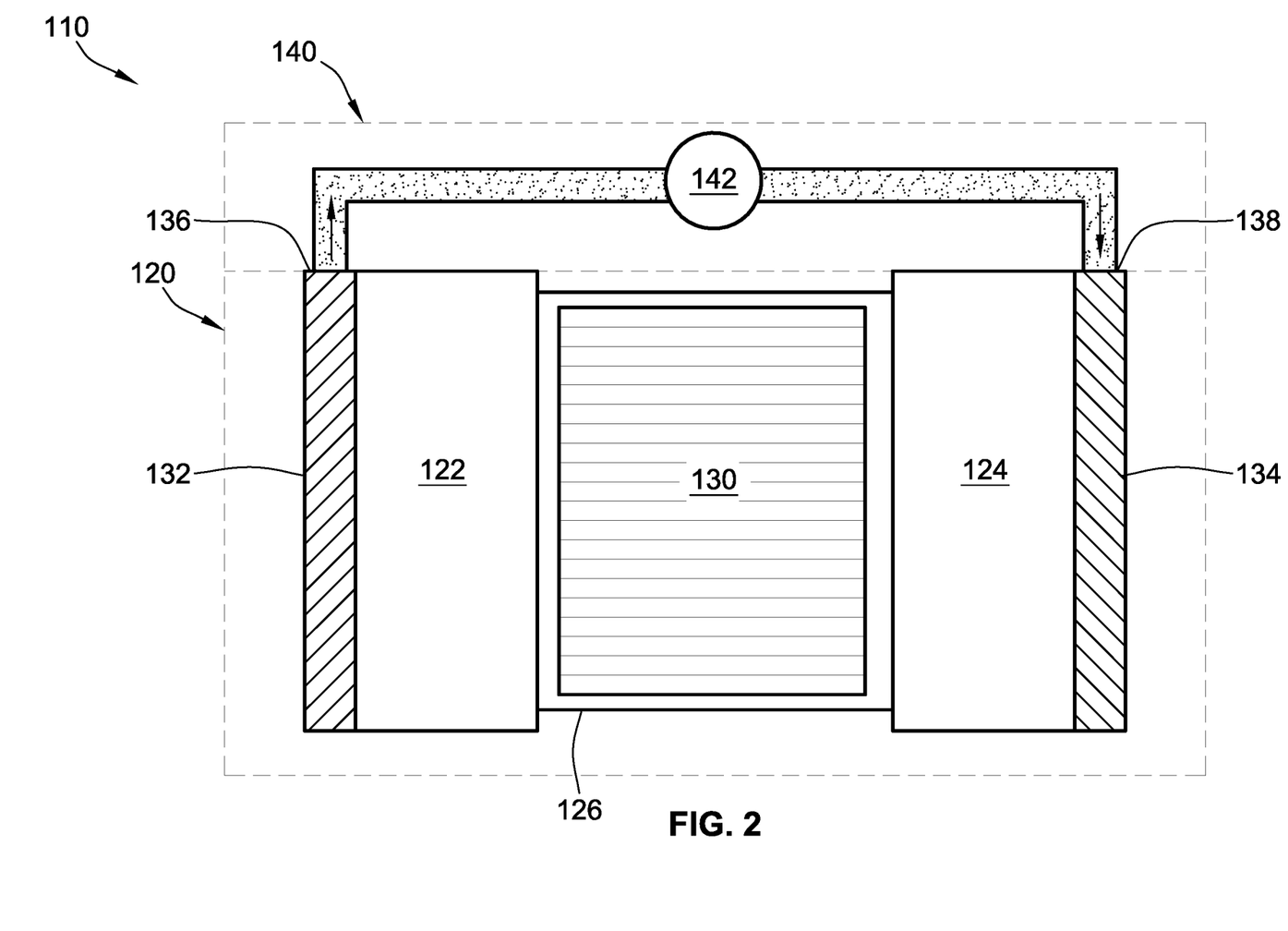
FIG. 2 is a schematic illustration of a representative lithium-class electrochemical device including a lithium-metal anode in accordance with aspects of the present disclosure.

Presented in FIG. 2 is an exemplary electrochemical device in the form of a rechargeable (secondary) lithium-ion battery 110 that may offer direct current fast charging (DCFC) and power a desired electrical load, such as automobile 10 of FIG. 1. Battery 110 includes a pair of electrically conductive electrodes, namely a first (negative or anode) working electrode 122 and a second (positive or cathode) working electrode 124, packaged inside a protective outer housing 120. In at least some configurations, the battery housing 120 may be an envelope-like pouch that is formed of aluminum foil or other suitable sheet material. Both sides of a metallic pouch may be coated with a polymeric finish to insulate the metal from the internal cell elements and from adjacent cells, if any. Reference to either working electrode 122, 124 as an "anode" or "cathode" or, for that matter, as "positive" or "negative" does not limit the electrodes 122, 124 to a particular polarity as the system polarity may change depending on how the battery 110 is being operated (i.e., charged or discharged). Although FIG. 2 illustrates a single battery cell unit inserted within the battery housing 120, it should be appreciated that the housing 120 may stow therein a rolled or sandwiched stack of multiple cell units (e.g., five to fifteen cells).

With continuing reference to FIG. 2, anode electrode 122 may be fabricated from an electrically conductive material that is capable of incorporating lithium ions during a battery charging operation and releasing lithium ions during a battery discharging operation. In at least some implementations, the anode electrode 122 is manufactured, in whole or in part, from a lithium metal, such as lithium-aluminum (LiAl) alloy materials with an Li/Al atomic ratio in a range from 0 at. %≤Li/Al<70 at. %, and/or aluminum alloys with Al atomic ratio >50 at. %. In this regard, the cathode electrode 124 may be fabricated from a material that is capable of supplying lithium ions during a battery charging operation and incorporating lithium ions during a battery discharging operation. The cathode 124 material may include, for instance, lithium transition metal oxide, phosphate, or silicate, such as $LiMO_2$ (M=Co, Ni, Mn, or combinations thereof); $LiM_2O_4$ (M=Mn, Ti, or combinations thereof); $LiMPO_4$ (M=Fe, Mn, Co, or combinations thereof); and $LiM_xM'_{2-x}O_4$ (M, M'=Mn or Ni). It may be desirable that the anode electrode 122 and cathode electrode 124 be fabricated from materials that exhibit a long cycle life and calendar life, and do not experience a significant resistance increase throughout the life of the battery.

Disposed inside the battery housing 120 between the two electrodes 122, 124 is a porous separator 126, which may be in the nature of a microporous or nanoporous polymeric separator. The porous separator 126 may include a non-aqueous fluid electrolyte composition 130, which may also be present in the negative electrode 122 and the positive electrode 124. A negative electrode current collector 132 may be positioned on or near the negative electrode 122, and a positive electrode current collector 134 may be positioned on or near the positive electrode 124. The negative electrode current collector 132 and positive electrode current collector 134 respectively collect and move free electrons to and from an external circuit 140. An interruptible external circuit 140 with a load 142 connects to the negative electrode 122, through its respective current collector 132 and electrode tab 136, and to the positive electrode 124, through its respective current collector 134 and electrode tab 138. Separator 126 may be a sheet-like structure that is composed of a porous polyolefin membrane, e.g., with a porosity of about 35% to 65% and a thickness of approximately 25-30 microns. Electrically non-conductive ceramic particles (e.g., silica) may be coated onto the porous membrane surfaces of the separators 126.

The porous separator 126 may operate as both an electrical insulator and a mechanical support structure by being sandwiched between the two electrodes 122, 124 to prevent the electrodes from physically contacting each other and, thus, the occurrence of a short circuit. In addition to providing a physical barrier between the electrodes 122, 124, the porous separator 126 may provide a minimal resistance path for internal passage of lithium ions (and related anions) during cycling of the lithium ions to facilitate functioning of the battery 110. In lithium-ion batteries, this helps to prevent the lithium from alloying or intercalating in the electrode active materials during battery discharge. For some optional configurations, the porous separator 126 may be a microporous polymeric separator including a polyolefin. The polyolefin may be a homopolymer, which is derived from a single monomer constituent, or a heteropolymer, which is derived from more than one monomer constituent, and may be either linear or branched. In a solid-state battery, the role of the separator may be partially/fully provided by a solid electrolyte layer.

Operating as a rechargeable energy storage system (RESS), battery 110 generates electric current that is transmitted to one or more loads 142 operatively connected to the external circuit 140. While the load 142 may be any number of electrically powered devices, a few non-limiting examples of power-consuming load devices include an electric motor for a hybrid electric vehicle or an all-electric vehicle, a laptop computer or tablet computer, a cellular smartphone, cordless power tools and appliances. The battery 110 may include a variety of other components that, while not depicted herein for simplicity and brevity, are nonetheless commercially available and readily available. For instance, the battery 110 may include one or more gaskets, terminal caps, tabs, battery terminals, and other commercially available components or materials that may be situated on or in the battery 110. Moreover, the size and shape and operating characteristics of the battery 110 may vary depending on the particular application for which it is designed.

High-energy density electrochemical cells, such as lithium-ion batteries and battery packs, are used in a variety of consumer products and vehicles. Many different conductive materials and manufacturing processes may be used to create the working components of a lithium-ion battery cell. Common electrode materials may include lithium insertion materials or alloy host materials, such as lithium-graphite intercalation compounds or lithium-silicon compounds, lithium-tin alloys, and lithium titanate (LTO). For a lithium metal battery, the negative (anode) electrode of each cell may be made of metallic lithium (often referred to as a lithium metal anode (LMA)). Use of LMA electrodes may offer one of the highest theoretical battery capacities and lowest electrochemical potentials. When compared to other lithium-ion battery designs, batteries incorporating LMA electrodes may offer a higher energy density and potentially double storage capacity while halving the size of the battery and maintaining a similar life cycle.

Enhanced performance of lithium metal batteries, including decreased resistance and impedance during cell cycling, may be achieved through strengthened long-term adhesion of a lithium metal foil to a metal current collector of the electrode. Discussed below are metal casting processes and melt spinning methods for forming lithium-metal foils that may offer improved electrode-to-collector adhesion during the manufacture of lithium-class batteries. In general, a thin Li-metal foil is formed through a planar-flow melt spinning process. Melted lithium metal is jetted out of a narrow-slotted nozzle as a substantially uniform thickness blanket onto an actively cooled surface of a spinning quench wheel or a carrier film buttressed on a spinning support roller. Using a polymeric carrier sheet, such as a PET film, may help to improve handling and reduce oxidation. Alternatively, the lithium metal may be melt spun directly onto a current collector foil for in-line bonding of a Li-metal foil onto a current collector in a single process. For double-sided LMA electrodes, an opposing surface of the same current collector foil may be bonded to another melt spun Li-metal foil at a downstream vessel and wheel pair.

Ejection of the molten lithium metal from an internal cavity of the heated vessel may be provisioned via pressurized inert gas, such as argon, xenon, neon, or other inert gas that does not react exothermically with lithium. Alternative mechanisms for expelling lithium metal from the crucible may include pneumatic actuators, hydraulic actuators, and electro-mechanical actuators (e.g., power screw or plunger). Foil thickness may be controlled by adjusting the flow rate of the molten Li metal, the gap between the nozzle and spinning quench wheel/carrier film, and the rotational/translational speed of the quench wheel/film. The slotted nozzle at the base of the crucible may be heated to assist in producing a planar flow. The film width may be selectively varied by controlling the length of the slot in the nozzle. Using novel surface coatings (e.g., Al, Zn, metal oxide, etc.) and surface textures help to improve film-to-carrier adhesion in planar-flow melt spinning. Pretreatment coatings and surface texturing may be applied electrolytically, via plasma vapor deposition or atomic layer deposition, solution spray, or other coating or etching processes. A protective film may be applied onto the solidified foil for ease of handing and to protect the lithium metal from oxidation and sticking.

Figure 3:
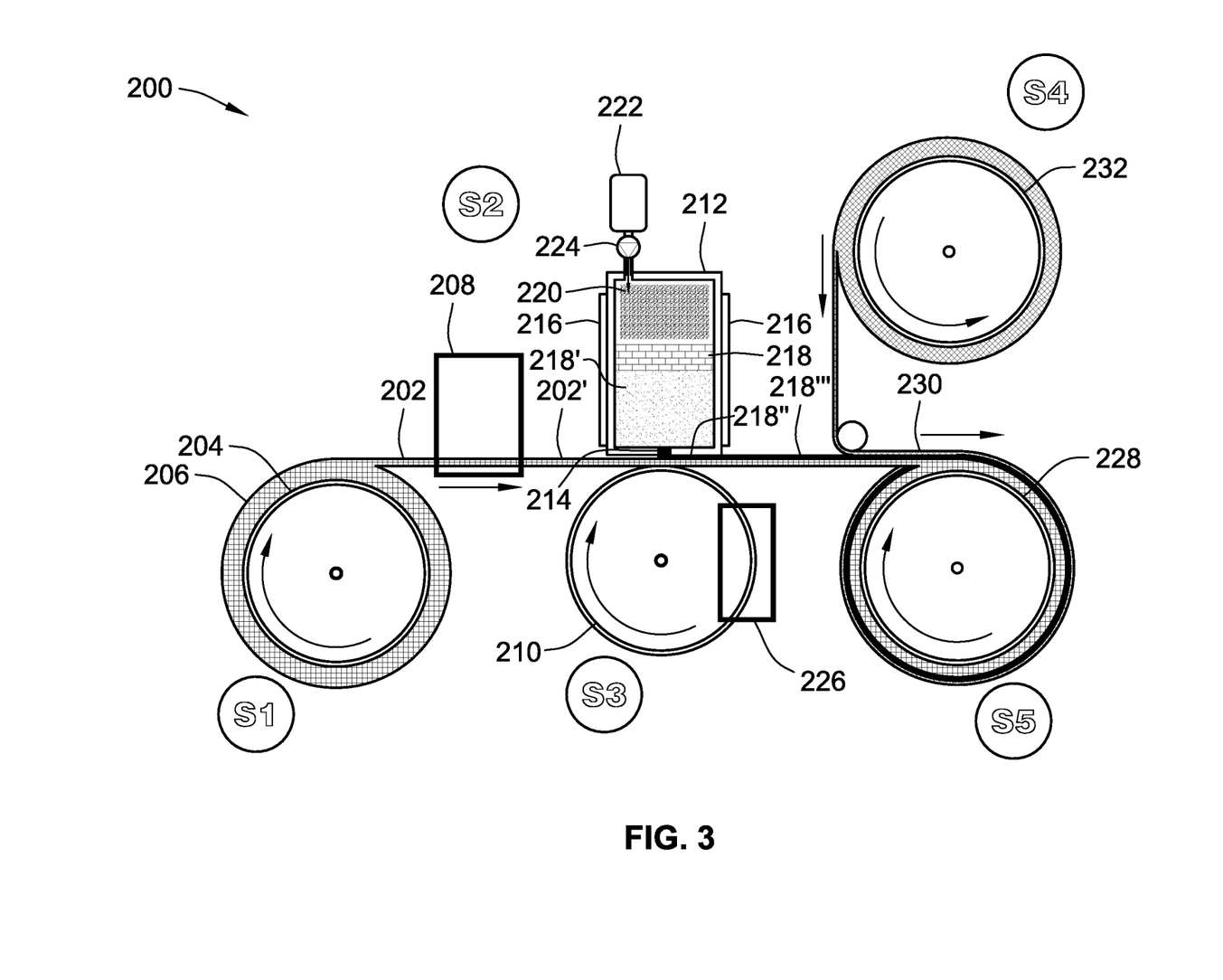
FIG. 3 is a workflow diagram illustrating a representative melt spinning system and method for manufacturing a lithium-metal foil, e.g., for an electrode of an electrochemical device, in which some or all of the operations may correspond to memory-stored, controller-executable instructions in accord with aspects of the disclosed concepts.

With reference next to FIG. 3, there is shown an example of a manufacturing system and attendant manufacturing process (collectively designated as 200) for producing lithium-metal foils that may be used for pre-lithiation treatment of battery electrodes or for an electrode of an electrochemical device, such as battery 110 of FIG. 2, for powering a load, such as motor/generator unit 14 of FIG. 1. Some or all of the operations illustrated in FIGS. 3-5, and described in further detail below, may be automated through execution of processor-executable instructions, for example, by manufacturing system control hardware. These instructions may be stored, for example, in main or auxiliary or remote memory, and executed, for example, by an electronic controller, processing unit, control logic circuit, or other module or device or network of modules/devices, to perform any or all of the above and below described functions associated with the disclosed concepts. It should be recognized that the order of execution of the illustrated operations may be modified, additional operations may be added, and some of the described operations may be modified, combined, or eliminated.

Manufacturing system/process 200 of FIG. 3 may begin at a first manufacturing station S1 with pushing, pulling, or otherwise retrieving (collectively "feeding") an elongated and substantially flat carrier sheet 202 that functions as a cooling and support substrate for melt spun lithium metal.

According to the illustrated example, the carrier sheet 202 is a continuous strip of metallic or polymeric sheet material that is drawn from a sheet material supply roll 206 that is buttressed on and rotatable about an idling feed roller 204. Alternatively, a feeder motor (not shown) may automate the systematic unwrapping and pay out of the carrier sheet 202 from the supply roll 206. The carrier sheet 202 may have a thickness of approximately 5 micrometers (μm) to approximately 25 μm and may be a polymeric film fabricated, in whole or in part, from polyethylene terephthalate (PET), or a current collector foil fabricated, in whole or in part, from copper, titanium, steel, nickel, alloys or combinations thereof, or other apropos conductive metallic materials.

De-spooled carrier sheets 202 may undergo optional pretreatment at a second manufacturing station S2 prior to casting. Pretreatment may include chemical stripping and descaling during which the surface is treated with a hydrochloric acid solution or other cleaning and stripping agent in order to remove transport coatings, impurities, contaminants, scale, stains, and rust. In addition or alternatively, top-side and, optionally, bottom-side contact surfaces of the carrier sheet 202 may undergo a bond-enhancing surface treatment within a coating/texturizing machine 208 to improve the carrier sheet's affinity to lithium metal and to control delamination. For instance, surface pretreatment of copper foils with a reducing plasma gas facilitates the successful deposit of lithium metal in thin layers on a copper foil current collector and enhances the interface between the copper and lithium metal. It should be appreciated that carrier sheet pretreatment may take on any of the other options described herein and may be completed offline, i.e., at a discrete workstation or facility, prior to feeding the carrier sheet 202 into the melt spinning station.

The pretreated carrier sheet 202' is transferred from the feed roller 204 and through the optional pretreatment second manufacturing station S2 into a melt spinning third manufacturing station S3, where it is threaded between a quench wheel/support roller 210 and a narrow-slotted nozzle 214 of a heated vessel 212. At this juncture, a batch of lithium metal stock 218, such as lithium or Li-alloy ingots, pellets, discs, granules, etc., is melted inside a high-temperature, precision-controlled vessel 212, which may include a fluid-tight, stainless steel chamber containing therein an iron, nickel, tantalum, or boron-nitride crucible. In accord with the illustrated example, a pair of 15-25 kW (30-80 Khz) electrical induction or resistance heating elements 216 heat the vessel 212 to at least about 180° C. or, in some embodiments, between 190° C. and 300° C. (±5° C.). The metal stock 218 may be melted for a predetermined minimum melt time (e.g., at least about 40 minutes to about 120 minutes) to obtain a substantially homogeneous melt sans water and gas pockets. The temperature of the melt 218' may be controlled using controlled-loop feedback data from an infrared thermometer positioned on the vessel 212. The melted Li-metal 218' expelled through the nozzle 214 may contain other materials, including materials that form a surface treatment when the mixture contacts the surface of the carrier sheet 202' (e.g., a few percent of an alloying material).

After liquefying the lithium metal stock 218 into a molten metal pool 218', the heat-liquefied Li metal 218' is ejected from the vessel 212 through the slotted nozzle 214 to produce a planar flow of liquid metal. In accord with the illustrated example, an inert gas 220, such as vacuum-compressed and humidity-controlled argon, is pumped via a valve-regulated unidirectional electric pump 224 from an inert gas tank 222 and injected into the vessel 212. The inert gas 220 is pressurized, e.g., via electric pump 224 or an optional double-stage, rotary-vane vacuum pump, to a predetermined differential ejection pressure, e.g., of about 40 Pa to about 400 Pa. It may be desirable, for at least some implementations, to actively control a thickness of resultant Li-metal foils by selectively adjusting the vessel's internal ejection pressure and, thus, an exit flowrate at which the molten Li metal 218' is jetted out through the slotted nozzle 214. Further options for adjusting foil thickness include a vertically adjustable nozzle 214 and/or quench wheel/support roller 210 for adjusting a gap distance between the slotted nozzle 214 and the contact surface of the pretreated carrier sheet 202' or quench wheel 210. Alternatively, a rotational speed of the quench wheel 210 or a translational speed of the carrier sheet 202' may be modulated to vary a thickness of the spun melt puddle and resultant Li-metal foils. The slotted nozzle 214 may be separately heated via a discrete heating element to facilitate the flow therethrough of molten metal.

During pressurization and heating of the inert vessel 212, molten Li metal 218' is concomitantly ejected from the slotted nozzle 214 and applied onto an outer-diameter (OD) contact surface of the actively cooled and spinning quench wheel 210 or onto the top-side contact surface of the moving carrier sheet 202' being fed across the spinning support roller 210 subjacent the sheet 202'. As noted above, the carrier sheet 202' may be a metallic current collector foil or a polymeric carrier film that is fed from the feed roller 204 underneath the vessel 212 and nozzle 214. In this instance, the molten Li metal 218' is directly impinged upon the top surface of the current collector foil/polymeric carrier film 202' to form a continuous sheet of molten Li metal 218''. The carrier sheet 202' may be directly or indirectly cooled, e.g., via a controller-automated cooling device 226 of FIG. 3.

For quench wheel implementations, the first and second manufacturing stations S1 and S2 may be altogether eliminated from the manufacturing system 200, and the molten Li metal 218' may be directly impinged upon a cooled surface of the spinning quench wheel 210. This quench wheel 210 may be in the nature of a metallic or ceramic quench wheel that is actively cooled, e.g., via a water, convection, or refrigerant-based cooling device 226, to an operating temperature of about 45 degrees Celsius (° C.) or less. In at least some intended applications, the melt spinning third manufacturing station S3 operates at a line/wheel speed of about 0.2 m/sec to about 10 m/sec, a transverse nozzle slot length of about 200 mm to about 600 mm, and a molten Li-metal flow rate of about 0.5 mL/sec to about 100 mL/sec.

With continuing reference to FIG. 3, the planar sheet of molten Li-metal 218'' cools and solidifies upon contact with the cooled spinning wheel 210/carrier sheet 202' to form a Li-metal foil 218'. For quench wheel implementations, the solidified metal foil 218' may be removed using centrifugal forces of the spinning wheel 210. Alternatively, for current collector foil applications, the molten Li-metal 218' is applied onto the moving carrier sheet 202' where the Li metal bonds and solidifies to the current collector foil material, e.g., to form an LMA electrode. The resultant lithium metal foil 218' may have a substantially uniform foil thickness of less than about 100 μm or, in some embodiments, about 10 to about 50 μm and a substantially uniform foil width of less than about 40 cm or, in some embodiments, about 10 to about 30 cm.

After solidifying the molten Li metal 218'', the carrier sheet 202' and foil 218' are fed through a fourth manufacturing station S4 such that an optional protective film 230 (e.g., of PET) may be dispensed from a protective film roller 232 and applied onto an exposed (upper) surface of the Li-metal foil 218' opposite that of the carrier sheet 202'. A motor-driven take-up roller 228 may draw the carrier sheet 202' and solidified Li-metal foil 218' out from under the slotted nozzle 214 at a fixed speed while pressure continues to force molten Li metal 218' out through the nozzle 214 at a fixed flow rate. At a fifth manufacturing station S5, the film/foil/carrier stackup is wound onto the take-up roller 228, e.g., for subsequent shipping or processing.

Figure 4:
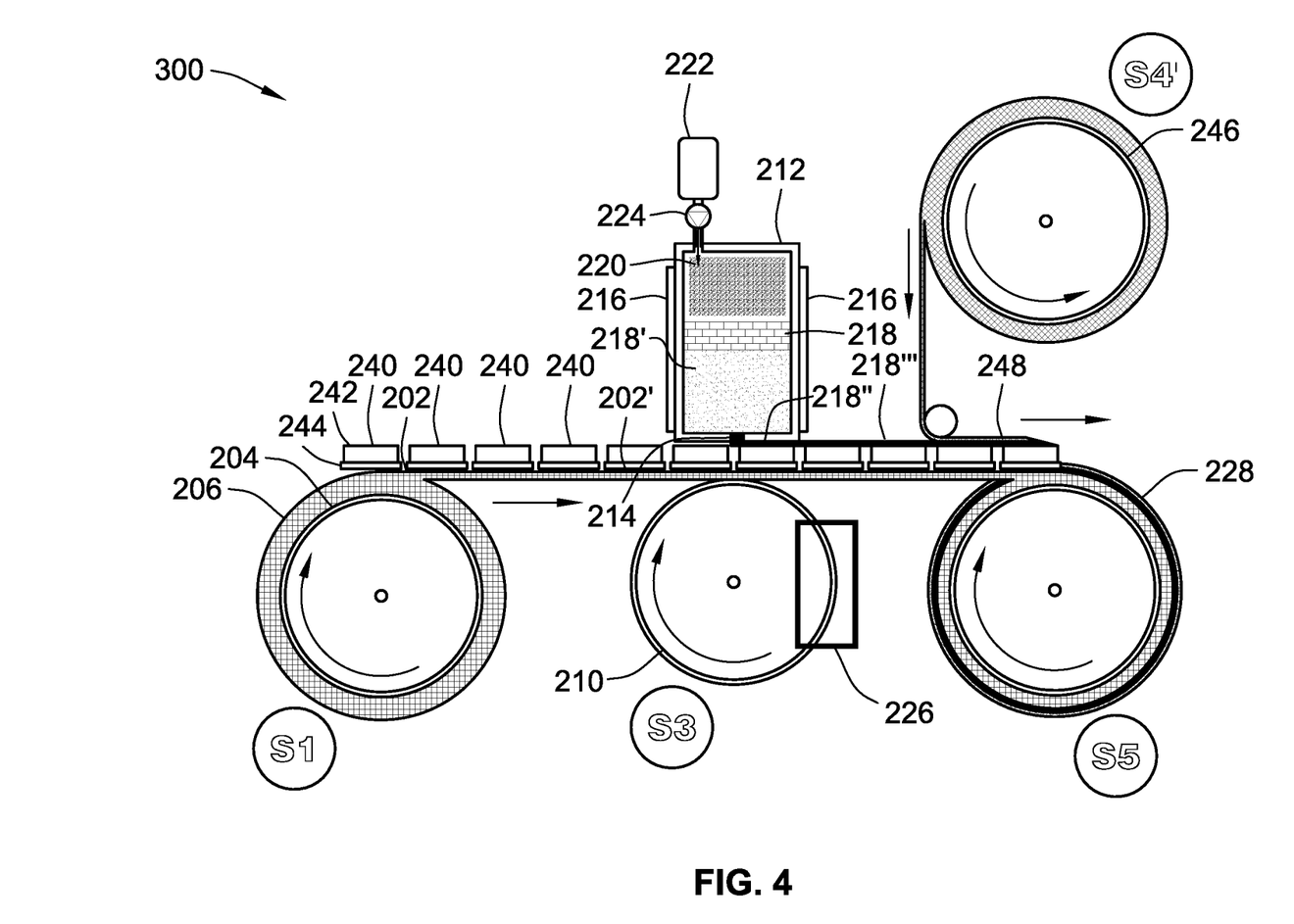
FIG. 4 is a workflow diagram illustrating another representative melt spinning system and method for manufacturing a lithium-metal foil, e.g., for an electrochemical device, in which some or all of the operations may correspond to memory-stored, controller-executable instructions in accord with aspects of the disclosed concepts.

Turning next to FIG. 4, wherein like reference numbers are used to designate the same components from FIG. 3, there is shown a second example of a manufacturing system and attendant manufacturing process (collectively designated as 300) for producing lithium-metal foils. Although differing in appearance, it is envisioned that any of the features and options described above with reference to the system and process 200 of FIG. 3 can be incorporated, singly or in any combination, into the systems and processes 300 and 400 of FIGS. 4 and 5, and vice versa. For instance, the representative melt spin manufacturing system 300 of FIG. 4 may employ the same or similar first, third, fourth and fifth manufacturing stations S1, S3, S4 and S5 described hereinabove and depicted in FIG. 3. By comparison, manufacturing system 300 of FIG. 4 may omit second manufacturing station S2, e.g., for applications in which pretreatment is not desired or is provided offline.

As a further discretionary point of demarcation, the molten Li metal 218' of FIG. 4 may be directly impinged upon a succession of pre-cut or a sheet of continuous-feed solid-state, single-side or double-side coated cathode electrodes 240 that are operatively supported on the top-side surface of the carrier sheet 202. Each solid-state cathode electrode 240 may be a composite of a solid-state electrolyte 242 that is buttressed on a cathode electrode material 244 (e.g., a coating of cathode composite layer with/without a predefined amount of solid electrolyte mixture applied onto a metallic current collector). By way of non-limiting example, the electrolyte 242 may be a ceramic electrolyte including garnet electrolyte (LLZO), sulfide-based electrolyte (LGPS), or polymer electrolyte stable at >200 C, or a mixture of two or more of the above. The cathode electrode material 244 may be active metal oxide materials, including NMCA, LMO, LCO, etc.

Carrier sheet 202, in cooperation with the feed, support and take-up rollers 204, 210 and 228, provides a stable working surface to carry solid-state cathode electrode pieces. In this instance, the solid-state cathode electrodes 240 are sequentially threaded between the support roller 210 and nozzle 214 to be covered in a sheet of molten lithium metal 218''. Once foil formation is complete, the stackup of Li-metal foil 218''', solid-state cathode electrode 240, and carrier sheet 202 may be covered with a negative current collector foil 248 fed from a collector foil roll 246 at a modified fourth manufacturing station S4'. At this juncture, a fully laminated solid-state battery has been produced with a structure as positive current collector/cathode coating layer/solid state electrolyte layer/Li-metal anode coating layer/negative current collector. The collector-foil-covered assemblies are thereafter wound onto the take-up roller 228. The formed Li-metal, solid-state batteries are packaged in individual sandwiched structures and transferred to cell assembly, for example. Semi-solidified Li-metal may be beneficial to lower interfacial resistance between the Li-metal foil and cathode. In addition, a pre-heated solid-state structure may also improve the interfacial behavior between solid-state electrolyte and li metal anode.

Figure 5:
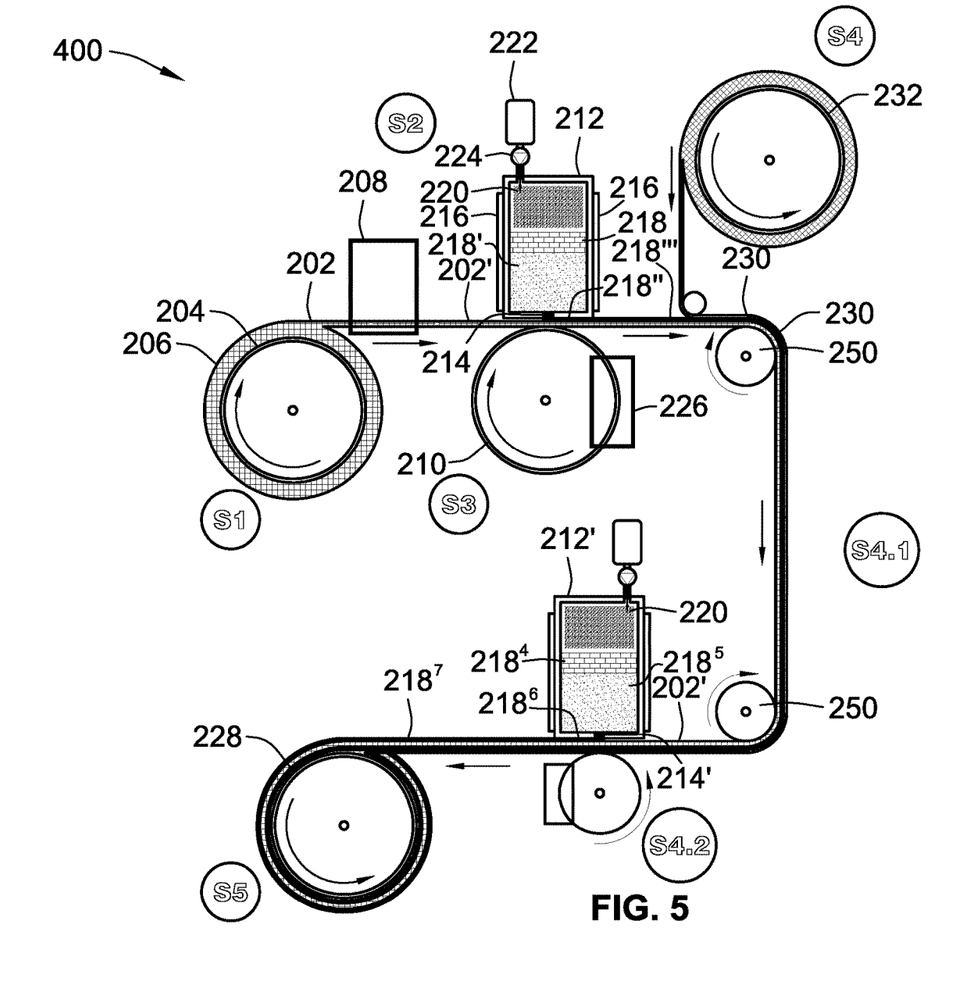
FIG. 5 is a workflow diagram illustrating yet another representative melt spinning system and method for manufacturing a lithium-foil, e.g., for an electrochemical device, in which some or all of the operations may correspond to memory-stored, controller-executable instructions in accord with aspects of the disclosed concepts.

With reference next to FIG. 5, wherein like reference numbers refer to like features from the views in FIGS. 3 and 4, there is shown a third example of a manufacturing system and attendant manufacturing process (collectively designated as 400) for producing lithium-metal foils. FIG. 5 is an example of a double-sided melt spinning process in which Li-metal foils are bonded to both sides of a carrier sheet. In this example, the representative melt spin manufacturing system 400 of FIG. 5 may employ the same (or similar) five manufacturing stations S1-S5 of FIG. 3. However, between the fourth and fifth manufacturing stations S4 and S5, the film/foil/carrier stackup is wound around a series of idler rollers 250 of a conveyor workstation S4.1 for processing at a second melt spinning station S4.2. For ease of manufacture and simplicity of design, the contents of the second melt spinning station S4.2 may be identical with or substantially similar to the melt spinning third manufacturing station S3 described above.

During the double-sided melt spinning process of FIG. 5, an additional batch of Li metal stock $218^4$ is melted inside a discrete vessel 212' to form another molten metal pool $218^5$. The molten metal pool $218^5$ is ejected through a slotted nozzle 214' of the vessel 212' by any of the ejection processes described above. The ejected batch of molten Li metal $218^5$ is applied onto an opposing side of the carrier sheet 202 opposite the Li-metal foil 218''' to form a continuous sheet of molten Li metal $218^6$. Once cooled and solidified, the sheet of molten Li metal $218^6$ form a second Li-metal foil 218' to thereby sandwich the carrier sheet 202 between the two solidified foils.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, solid-state memory, a hard drive, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of melt spinning lithium-metal foils, the method comprising:
   melting a lithium (Li) metal stock in a vessel to form molten Li metal;
   ejecting the molten Li metal through a slotted nozzle of the vessel;
   cooling a carrier sheet fed across a support roller, the carrier sheet including a succession or sheet of solid-state electrode stackups carried on the carrier sheet, each of the solid-state electrode stackups including a metallic current collector;
   applying the ejected molten Li metal onto the cooled carrier sheet fed across the support roller to form a sheet of molten Li metal; and
   solidifying the sheet of molten Li metal on the cooled carrier sheet to form a Li-metal foil, wherein the molten Li metal solidifies and bonds to the solid-state electrode stackups via cooling of the carrier sheet.

2. The method of claim 1, wherein the carrier sheet is a metallic sheet material fed from a feed roller, and wherein applying the ejected molten Li metal onto the cooled carrier sheet includes directly impinging the molten Li metal onto the solid-state electrode stackups on the carrier sheet to form the sheet of molten Li metal on the solid-state electrode stackups.

3. The method of claim 1, wherein cooling the carrier sheet includes passing the carrier sheet across a cooled spinning wheel.

4. The method of claim 3, wherein the cooled spinning wheel includes a metallic or ceramic quench wheel actively cooled to an operating temperature of about 45 degrees Celsius (° C.) or less, and wherein the cooled spinning wheel and the support roller are one and the same.

5. The method of claim 1, wherein ejecting the molten Li metal through the slotted nozzle of the vessel includes:
   injecting an inert gas into the vessel; and
   pressurizing the inert gas to at least a predetermined chamber ejection pressure.

6. The method of claim 1, further comprising, prior to ejecting the molten Li metal, pretreating a contact surface of the carrier sheet or the solid-state electrode stackups with a bond-enhancing surface treatment.

7. The method of claim 6, wherein the bond-enhancing surface treatment includes coating, texturizing, and/or calendaring the contact surface.

8. The method of claim 7, wherein the bond-enhancing surface treatment is applied to the contact surface via electrolysis, plasma vapor deposition, atomic layer deposition, solution spray, and/or etching.

9. The method of claim 1, further comprising modulating a thickness of the Li-metal foil by adjusting a flowrate at which the molten Li metal is ejected through the slotted nozzle, adjusting a gap distance between the slotted nozzle and the cooled carrier sheet, and/or adjusting a speed of the cooled carrier sheet.

10. The method of claim 1, further comprising, after solidifying the sheet of molten Li metal, applying a protective film onto an exposed top surface of the Li-metal foil opposite the carrier sheet.

11. The method of claim 10, further comprising:
   melting a second lot of Li metal stock in a second vessel to form a second batch of molten Li metal;
   ejecting the second batch of molten Li metal through a second slotted nozzle of the second vessel;
   applying the ejected second batch of molten Li metal onto a second side of the carrier sheet or the solid-state electrode stackups opposite the Li-metal foil to form a second sheet of molten Li metal; and
   solidifying the second sheet of molten Li metal to form a second Li-metal foil.

12. The method of claim 1, wherein each of the solid-state electrode stackups includes a solid-state electrolyte and an active electrode material carried on the metallic current collector.

13. The method of claim 1, further comprising:
   feeding the carrier sheet from a feed roller;
   threading the carrier sheet between the support roller and the slotted nozzle of the vessel such that the ejected molten Li metal is applied directly onto the solid-state electrode stackups carried or the carrier sheet; and
   drawing the carrier sheet from the feed roller onto a motor-driven take-up roller.

14. The method of claim 1, wherein melting the Li metal stock includes induction heating or resistance heating the vessel to at least about 180 degrees Celsius (° C.).

15. A melt spinning system for producing lithium-metal foils, the melt spinning system comprising:
   a vessel configured to stow therein a lithium (Li) metal stock;
   an active heating element in thermal communication with the vessel and configured to selectively melt the Li metal stock to form molten Li metal;
   a slotted nozzle attached to the vessel and configured to eject therefrom the molten Li metal;
   a feed roller bearing a carrier sheet, the carrier sheet including a plurality of solid-state electrode stackups carried on the carrier sheet, each of the solid-state electrode stackups including a metallic current collector; and
   a cooled spinning wheel configured to cool the carrier sheet as the carrier sheet passes adjacent the slotted nozzle, the carrier sheet being configured to receive thereon and solidify a sheet of the ejected molten Li metal to form a Li-metal foil.

16. The melt spinning system of claim 15, wherein the carrier sheet is a metallic sheet material fed from the feed roller across the cooled spinning wheel to a take-up roller, and wherein the ejected molten Li metal is directly impinged onto a top surface of the solid-state electrode stackups on the current collector foil.

17. The melt spinning system of claim 16, wherein the active heating element includes an induction heating device or a resistance heating device configured to heat the vessel to at least about 180 degrees Celsius (° C.).

18. The melt spinning system of claim 15, wherein the carrier sheet is a continuous strip of metallic sheet material fed from the feed roller, between the slotted nozzle and the cooled spinning wheel, to a take-up roller.

19. The melt spinning system of claim 15, further comprising a protective film roller configured to apply a protective film onto an exposed surface of the Li-metal foil opposite the carrier sheet.

20. The melt spinning system of claim 15, wherein the cooled spinning wheel is located underneath the slotted nozzle, wherein the carrier sheet is configured to thread between the cooled spinning wheel and the slotted nozzle of the vessel such that the ejected molten Li metal is applied directly onto the solid-state electrode stackups on the carrier sheet, the system further comprising a motor-driven take-up roller drawing the carrier sheet from the feed roller.

\* \* \* \* \*